United States Patent Office 3,422,347
Patented Jan. 14, 1969

3,422,347
COMPARATOR CIRCUIT HAVING A HALL GENERATOR FOR MEASUREMENT OF D.C. MAGNETIC FIELDS
Clarence D. Cox, Bells Corner, Ottawa, Ontario, Canada, assignor to Canadian Patents and Development Limited, Ottawa, Ontario, Canada, a corporation of Canada
Filed Oct. 4, 1965, Ser. No. 492,652
Claims priority, application Canada, Oct. 6, 1964, 913,335/64
U.S. Cl. 324—45
Int. Cl. G01r 33/06
4 Claims

ABSTRACT OF THE DISCLOSURE

The present invention relates to an impedance comparator which may be used to determine the magnitude of an unknown impedance or may be modified for use in conjunction with a Hall effect device for the measurement of D-C magnetic fields.

Devices are known which may be used for determining the magnitude of an impedance with a high degree of accuracy. However, these devices are complex and expensive. The present invention provides a simple impedance comparator which requires the operation of only a single calibrated control to determine the magnitude of an unknown impedance. The circuit of the present invention provides for the connection of the unknown impedance in series with the calibrated resistance and then provides a very simple circuit for comparing the voltage drop across the unknown impedance with the voltage of the calibrated variable resistance, and a null detector for detecting when these two voltage drops are equal. When the voltage drops across the two elements are equal substantially no current flows in the null detector of the invention and the resistance value shown on the calibrated resistor can be related to the magnitude of the unkonwn impedance. Thus by varying the resistance of the calibrated variable resistor and observing the null detector, the magnitude of an impedance which is unknown, may be rapidly and easily determined. As previously mentioned the accuracy of the apparatus of the invention is to within a few percent. Apparatus according to the present invention may readily be constructed which is accurate to within one percent of the actual value of the magnitude of the unknown impedance. It should also be stressed that the circuit of the present invention will give the magnitude of any sort of impedance either resistive, inductive, capacitive or combination of anyone of these three but it does not, however, give any phase information which is essential to a determination of the character of the impedance. The present invention may also be used with a source of voltage of variable frequency and the impedance frequency characteristics of unknown impedances may readily be determined using the apparatus.

By replacing the unknown impedance by a Hall effect device and by making modifications to the circuit, it is possible to use the circuit of the present invention for the measurement of D-C magnetic fields to an accuracy of a few percent.

Figure 1:
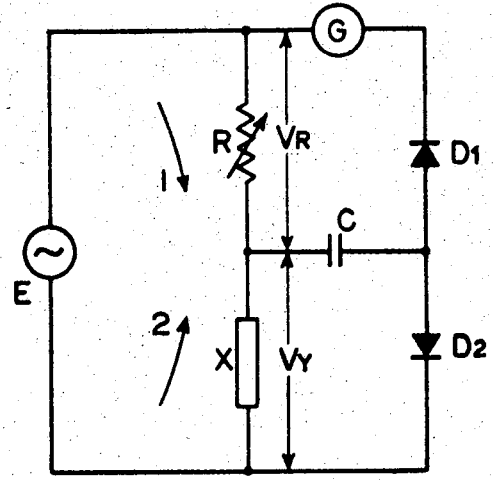
Figure 2:
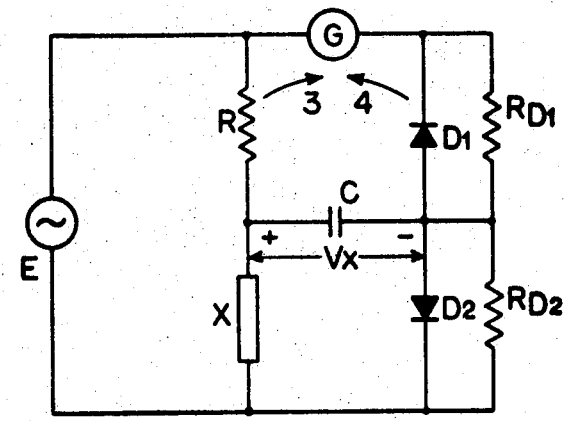
Figure 3:
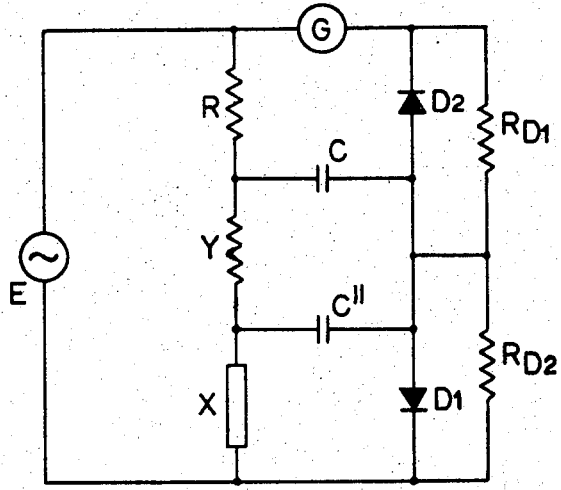
Figure 4:
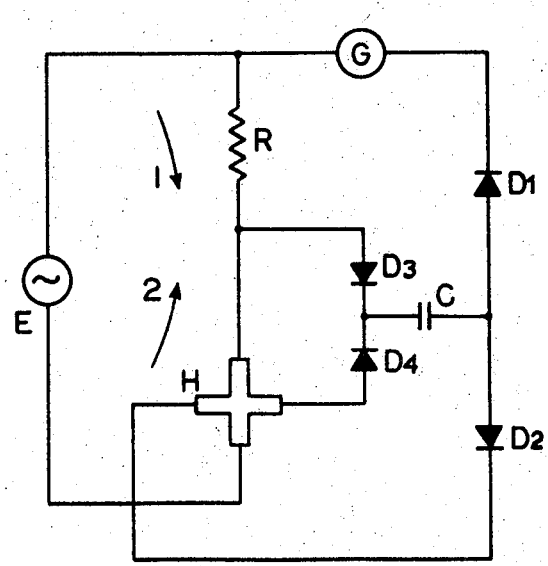
Figure 5:
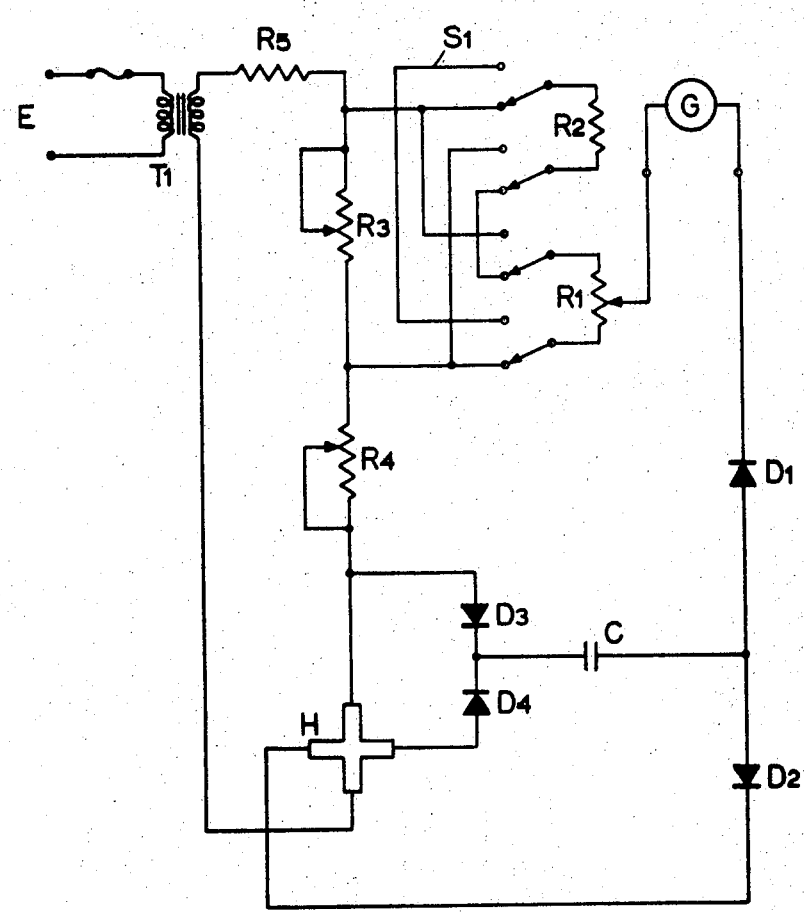

In drawings which illustrate embodiments of the invention used as an impedance comparator and embodiments of the invention used as a magnetic field measuring device or gauss meter, FIGURE 1 is a schematic diagram of an impedance comparator of the invention, FIGURE 2 is a revised form of the circuit of FIGURE 1, FIGURE 3 illustrates an alternative form of the circuit of FIGURE 1, FIGURE 4 is a schematic diagram of a gauss meter of the present invention, and FIGURE 5 is a schematic diagram of an actual gauss meter constructed in accordance with the teachings of the present invention.

Referring to FIGURE 1 there is shown a circuit in accordance with the present invention for comparing the magnitude of the impedance of an unknown device X with the resistance of a calibrated variable resistor R. The circuit as shown consists of the variable resistor R, a storage capacitor C, a pair of diodes $D_1$ and $D_2$ and a galvanometer G. The circuit is provided with a pair of terminals for connection to a source of alternating current voltage E. When the upper terminal of the source E is positive current will flow in the direction shown by the arrow 1 and the condenser C will be charged to a voltage $V_X$ through the diode $D_2$. During the following half cycle, current will flow in the direction shown by the arrow 2 and the capacitor C will be charged to a voltage $V_R$ through diode $D_1$. Since the variable resistance R and the unknown impedance X are in series, when $V_R$ the voltage drop across the calibrated resistance R is equal to $V_X$ the voltage drop across the unknown impedance then the reading shown by the calibrated resistance R is the magnitude of the impedance of the unknown impedance X at that frequency of the source. If X is resistive the magnitude of its impedance will not vary with frequency, however, if X is reactive the magnitude of its impedance will be a function of frequency. Accordingly when the voltage stored on the capacitor C does not vary from one half cycle to the next, $V_R$ equals $V_X$ and no current will flow through the galvanometer G, indicating that the value of resistance shown on the calibrated resistor R is equal to the magnitude of the impedance X.

Diodes $D_1$ and $D_2$, in FIGURE 1 actually have reverse resistances which are shown in FIGURE 2 as $R_{D1}$ and $R_{D2}$. If diodes are used in the construction of apparatus in accordance with the invention which have an extremely high reverse resistance then it may be necessary to add resistors in parallel with the diodes $D_1$ and $D_2$ as shown in FIGURE 2 to provide proper operation of the apparatus. It will be appreciated that resistors $R_{D1}$ and $R_{D2}$ also represent the reverse resistance of diodes $D_1$ and $D_2$ if these diodes do not have an excessively high resistance.

For the purposes of explanation, assume that the resistance $R_{D1}$ is equal to the resistance $R_{D2}$ and the resistance of each resistor is very much greater than the forward resistance of the associated diode. As previously mentioned $R_{D1}$ and $R_{D2}$ can be simply the normal reverse resistances of the diodes or when high quality solid state diodes are used it is necessary to provide a parallel resistance.

Consider the case when the impedance X is a pure resistance which is greater than R. In this case $V_X$ is greater than $V_R$ and the condenser charges to a voltage $V_X$ with the polarity shown in FIGURE 2. During the next half cycle the condenser is effectively in parallel with the series combination R, G, and $D_1$. Since $V_X$ is greater than $V_R$ the condenser discharges partially through R, G and $R_{D1}$. The current flows in direction 3 causing a deflection in G. This process is repeated every cycle giving a continuous galvanometer deflection. In the case that $V_X$ is less than $V_R$ the current flows in direction 4 giving a continuous galvanometer deflection in the opposite direction. When $V_X$ is equal to $V_R$ no deflection is observed. The resistance R is in series with X so that the same current flows through the two circuit elements. Then zero deflection in G indicates that R equals X.

Consider the case when X is a capacitor $C^1$. At balance the voltage across the capacitor equals the voltage across $R_1$ and the balance condition is $$iR = \frac{i(j)}{\omega C^1}$$

or $$R = \frac{1}{\omega C^1}$$

Where $\omega = 2\pi f$ and $f$ is the frequency of the alternating source E. This balance condition applies only when E is a sinusoidal source.

Consider the case when X is an inductance L with a winding resistance $R_L$. Then balance occurs when $$R = |R_L + j\omega L|$$

or $$R = \sqrt{R_L^2 + \omega^2 L^2}$$

This applies provided the source E is sinusoidal.

Typical components for the circuit of FIGURE 1 are:

E—signal generator 20 to 10,000 cycles per second,
G—medium sensitivity galvanometer for example 0.01 micro-amp per millimeter,
R—decade resistor of sufficiently high resistance to match the expected magnitude of the impedance of the unknown element,
C—5μF mylar capacitor having low loss, and
$D_1$ and $D_2$ IN356 or equivalent germanium diodes.

It is important to note that this circuit does not give a unique measurement of reactive elements. That is, the circuit does not give phase information, and the balance does not consist of real and imaginary parts as in a bridge, instead, the magnitude of an impedance is obtained in terms of a resistance magnitude. The circuit does not distinguish between inductive and capacitive reactance. However, inductance and capacitance can be identified by varying the frequency of the source E.

The circuit has characteristics which make it unsuitable as a precision measurement circuit. The balance point varies somewhat with the frequency and amplitude of the A.C. source. Thus, although the sensitivity of balance approaches that of a Wheatstone bridge, the accuracy of measurement is of the order of 1%. The balance inaccuracy arises from the fact that the diode characteristics are not identical. That is, the back resistances $R_{D1}$ and $R_{D2}$ depend on the applied back voltages and are not in general equal in any two diodes.

The circuit has an advantageous feature in that measurements may be made with large lead resistances. At balance the current in the galvanometer circuit is very small and approaches zero. During every cycle however the condenser charges and discharges by small equal amounts. Any resistances in the galvanometer condenser leads reduces the sensitivity but does not affect the balance point. Suppose the unknown X has associated with it a lead resistance Y as shown in FIGURE 3. X and Y may be of the same order of magnitude. A second condenser $C^{11}$ may be included as shown in FIGURE 3.

The balance point still occurs when the voltage across R equals the voltage across X and the resistance Y does not affect the balance.

The circuit may be used for the measurement of resistance where moderate accuracy is sufficient. It may be used for measurement of capacitors and high Q inductors. The primary balance condition is $R = X$, and a secondary condition is $R_{D1} = R_{D2}$. If both R and X are known resistances then the circuit may be used for accurate comparison of the back resistances of two diodes.

FIGURE 4 illustrates another form of the invention which is used as a gauss meter. This circuit makes use of a Hall-effect device which as is well known generates a Hall voltage proportional to the magnetic field in which the device is positioned when a constant current flows through the Hall device. Conventionaly Hall devices are used in connection with a source of constant current and a meter calibrated in field strength. Such Hall effect devices are commercially available and one suitable for use with the invention is the Beckman Halleflex model 350. The circuit of FIGURE 4 represents an improvement over prior gauss meters using a Hall effect device in that a constant current is not required and a null balance is used to measure the unknown field. With the circuit of FIGURE 4 an accuracy of 1% is obtained between 180 and 12,000 gauss.

Referring to FIGURE 4, an alternating current flows through the resistor R in series with a Hall generator H. During the first half cycle the current is in direction 1, and the condenser charges through $D_3$ and $D_2$ to a voltage equal to $$V_1 = \frac{iR_G}{2} + \frac{V_H}{2}$$

where $i$ is the peak current, $R_G$ is the resistance of the Hall generator between the current terminals, and $V_H$ is the peak Hall voltage. During the second half cycle the current flows in direction 2 and the condensor charges to a voltage $$V_2 = \frac{iR_G}{2} + iR - \frac{1}{2}V_H$$

When $V_1$ is greater than $V_2$ the condenser charges through $D_2$ on one half cycle and discharges through $D_1$ and the galvanometer G on the next half cycle. If $V_2$ is greater than $V_1$ the condenser charges through $D_1$ and G and the galvanometer deflection is in the opposite direction. When $V_1$ equals $V_2$ the galvanometer deflection is zero and $$iR = V_H = kiB \text{ so that } R = kB$$

where B is the magnetic field strength and $k$ is a constant. It is seen that the field is directly proportional to the resistance and is independent of the current.

The complete gauss meter circuit is shown in FIGURE 5. A 60 cycle signal from source E is supplied through a small isolating transformer $T_1$, and an 18K resistor $R_5$ holds the current to a maximum of 10 ma. The 5μfd—100 v. capacitor C is a mylar film or equivalent quality low leakage unit. The actual capacity is not critical and may have any value between 1 and 10μfd. The diodes $D_1$, $D_2$, $D_3$ and $D_4$ are matched pairs of IN35's, but any inexpensive germanium diodes may be used. Circuit analysis shows that it is necessary to have some back current in the diodes in order to obtain a null balance, and for this reason germanium diodes are preferred. Silicon diodes may be used provided they are shunted by a few megohms resistance. The 1K precision resistor $R_2$ in series with the 1K ten turn helical potentiometer (Helipot) $R_1$ is in parallel with the 250 ohm calibration potentiometer $R_3$, and the range switch S operates to interchange the position of the helipot $R_1$ and precision resistor $R_2$.

The set-up procedure is as follows: The Hall generator is placed in a zero field region and the galvanometer nulled using the zero control $R_4$. The zero field signal arises from geometrical unbalance in the Hall side arms, and differences in the diode characteristics. With the switch S in position 1, the Hall generator is placed in a known field of, say, 5,000 gauss, with the Helipot $R_1$ dials set to 500, and the calibration control is adjusted to zero the galvanometer. This completes the calibration. Unknown fields between 0 and 100 kilogauss are measured by adjusting the Helipot to obtain a null, and reading the field from the dial. With the switch in position 2 a constant 10 kilogauss is added to the dial reading. The circuit performance was checked against a precision gauss meter. After calibration at 5 kilogauss the error increased to a maximum of 1% low at 12 kilogauss. Below 5 kilogauss the readings agreed with the standard to within one division on the Helipot dial down to 160 gauss. To investigate the performance of the circuit at low fields the Helipot $R_1$ was re-calibrated to read a maximum of 1,000 gauss, and the readings were compared with the standard for fields between 1,000 and 160 gauss. The maximum error was 1.5% high at 160 gauss. For fields between 180 and 1,000 gauss the error was less than 1%.

I claim:

1. An impedance comparator for comparing the impedance of an unknown with the resistance of a calibrated variable resistor comprising a source of alternating current voltage, said unknown impedance and said calibrated variable resistor being connected in series and across said source of alternating current voltage, a pair of diodes, a capacitor having one terminal connected to the juncture between said unknown and said resistor, the other terminal of said capacitor being connected to the anodes of said diodes, the cathode of one of said diodes being connected to the side of said source connected to said unknown, and the cathode of the other of said pair of diodes being in series with a current indicating device and connected to the side of said source connected to said resistor.

2. Apparatus according to claim 1 wherein said current indicating means comprises a galvanometer.

3. A gauss meter comprising a source of alternating current voltage, a calibrated variable resistor, a Hall effect device having a pair of current terminals and a pair of voltage terminals, said resistor and the current terminals of said Hall effect device connected in series and across said source, a first pair of diodes having their cathodes connected together and to one terminal of a capacitor, the other terminal of said capacitor being connected to the anodes of a second pair of diodes, the anode of one of said first pair of diodes being connected to the juncture of said resistor and a current terminal of said Hall effect device, the anode of the other of said first pair of diodes being connected to a voltage terminal of said Hall effect device, the cathode of one of said second pair of diodes being connected to the second voltage terminal of said Hall effect device, the cathode of the other of said second pair of diodes being connected in series with a current indicating device and to the terminal of said source of alternating current voltage to which said resistor is also connected.

4. Apparatus according to claim 3 wherein said current indicating means comprises a galvanometer.

References Cited

UNITED STATES PATENTS 3,041,479  6/1962  Sikorra _____ 307—146

OTHER REFERENCES

Dauphinee et al., "Resistivity and Hall Coefficient," The Review of Scientific Instruments, vol. 26, No. 7, July 1955, pp. 660–662.

RUDOLPH V. ROLINEC, *Primary Examiner.*

E. E. KUBASIEWICZ, *Assistant Examiner.*

U.S. Cl. X.R.

324—57